United States Patent [19]

Kikuchi et al.

[11] Patent Number: 5,712,740
[45] Date of Patent: Jan. 27, 1998

[54] METHOD FOR REDUCING WASTED STORAGE SPACE WHEN STORING MULTIPLE DATA BLOCKS ON A STORAGE MEDIUM

[75] Inventors: Akihiro Kikuchi; Tsuyoshi Nishio, both of Kanagawa, Japan

[73] Assignee: Sony Corporation, Tokyo, Japan

[21] Appl. No.: 607,009

[22] Filed: Feb. 26, 1996

[30] Foreign Application Priority Data

Feb. 28, 1995 [JP] Japan .................................. 7-064702

[51] Int. Cl.$^6$ ............................................. G11B 5/09
[52] U.S. Cl. ..................... 360/48; 369/59; 395/404; 395/497.01
[58] Field of Search ........................ 360/48; 369/47, 369/48, 59; 395/404, 497.02, 497.03, 497.04, 497.01

[56] References Cited

U.S. PATENT DOCUMENTS 5,321,558  6/1994  Tackett .................................. 360/48

FOREIGN PATENT DOCUMENTS 3-259458  11/1991  Japan .................................. 360/48

*Primary Examiner*—Aristotelis M. Psitos
*Assistant Examiner*—Alan Faber
*Attorney, Agent, or Firm*—William S. Frommer; Alvin Sinderbrand

[57] ABSTRACT

A method for reducing the blank spaces resulting from the storage of multiple data blocks on a storage medium. In one embodiment, data is stored on a magnetic tape. Data to be written to the tape is partitioned into user data blocks and management data blocks, the user data blocks being written on the tape sequentially in a longitudinal direction in tracks along the tape, and the management data blocks being written in tracks on the tape sequentially in a longitudinal direction that is opposite the write direction of the user data blocks. Writing the user data and management data in directions that are inversely related allows the amount of wasted storage space to be reduced.

5 Claims, 17 Drawing Sheets

MAGNETIC TAPE

Fig. 18

| BYTE OFFSET IN ID | (MSB) BYTE3 | BYTE2 | BYTE1 | (LSB) BYTE0 |
|---|---|---|---|---|
| 116992 | ID OF FIRST DATA BLOCK (= 0000FFFFh/0000FF00h) | | | |
| 116996 | FILE NO. OF FIRST DATA BLOCK | | | |
| 117000 | BLOCK NO. OF FIRST DATA BLOCK | | | |
| 117004 | ABSOLUTE BLOCK NO. OF FIRST DATA BLOCK | | | |
| 117008 | START ADDRESS OF FIRST DATA BLOCK | | | |
| 117012 | L | S | DATA SIZE OF FIRST DATA BLOCK | |
| 117016 | TOTAL NUMBER OF BYTES OF ABN INCLUDING THIS BLOCK | | | |
| 117020 | RESERVED (=00000000h) | | | |
| 100640 | ID OF N-TH DATA BLOCK (= 0000FFFFh/0000FF00h) | | | |
| 100644 | FILE NO. OF N-TH DATA BLOCK | | | |
| 100648 | BLOCK NO. OF N-TH DATA BLOCK | | | |
| 100652 | ABSOLUTE BLOCK NO. OF N-TH DATA BLOCK | | | |
| 100656 | START ADDRESS OF N-TH DATA BLOCK | | | |
| 100660 | L | S | DATA SIZE OF N-TH DATA BLOCK | |
| 100664 | TOTAL NUMBER OF BYTES OF ABN INCLUDING THIS BLOCK | | | |
| 100668 | RESERVED (=00000000h) | | | |

Fig. 19

| BYTE WORD | (MSB) BYTE3 | BYTE2 | BYTE1 | (LSB) BYTE0 |
|---|---|---|---|---|
| 0 | IDENTIFICATION | | | (=0000FFFFh) |
| 1 | A | LOGICAL ID | | (>=0000001Ah) |
| 2 | C | EFFECTIVE BLOCK TABLE COUNT | | |
| 3 | INITIALIZE NO. FOR VOLUME | | | |
| 4 | OVERWRITE COUNTER FOR VOLUME | | | |
| 5 | W | WRITE RETRY COUNT | | (=00000000h) |
| 6 | DRIVE SERIAL NO. | | | |
| 7 | ROM VERSION | | | |
| 8~12 | LOGICAL VOLUME NO. | | | (=00000000h) |
| 13 | INITIALIZE NO. OF TAPE | | | |
| 14 | OVERWRITE COUNTER OF TAPE | | | |
| 15 | FORMAT TYPE | | | (=00000001h) |
| 16 | CREATE TIME | | | (=00000000h) |
| 17 | NUMBER OF MOUNTS | | | |
| 18 | NUMBER OF READ RETRY | | | |
| 19 | NUMBER OF RECOVER | | | |
| 20 | RECOVER FAILER FLAG | | | (=00000000h) |
| 21~33 | RESERVED | | | (=00000000h) |

METHOD FOR REDUCING WASTED STORAGE SPACE WHEN STORING MULTIPLE DATA BLOCKS ON A STORAGE MEDIUM

BACKGROUND OF THE INVENTION

1. Field of the Invention

The present invention relates to a data recording method for use with a data recording apparatus for sequentially recording a large amount of data, in particular, for use with a data recording apparatus for recording data on a magnetic tape with a helical scan head.

2. Description of the Related Art

As data amount to be handled increases day by day, the necessity of a data recording apparatus that can record such a large amount of data on a magnetic tape is becoming strong as a means for storing a large amount of data. On a recording medium that uses such a magnetic tape, unlike with a magnetic medium that is a disc, the data is almost sequentially recorded. As one type of magnetic tape apparatuses, a helical scan type apparatus that records digital data on a cassette tape with a rotating head is known.

As shown in FIG. 1, when digital data is recorded corresponding to the helical scan type recording method, helical tracks are formed on the magnetic tape. Data recorded on the magnetic tape is managed every at least one tracks as a data management unit (that is referred to as track set). FIG. 2 shows an example of the structure of a track set. In FIG. 2, the top position of data is on the left (namely, data is recorded from the left).

Headers 200a and 200b that are header information areas are formed at the top positions of a track set. The headers 200a and 200b are followed by a user data area 201. In the user data area 201, blocks of data are written. In this example, three blocks 201a, 201b, and 201c are written in the user data area 201.

The user data area 201 is followed by a block management table area 202. The start position of the block management table area 202 is predetermined and fixed. The information of the start position of the block management table area 202 is included in the header 200b. In this example, the start position of the block management table area 202 is point A.

The number of block management tables to be formed accords with the number of blocks written in the user data area. In each block management table, the position of a block in the track set, the size of the block, and an attribute of the block that represents whether or not the block is a part of a large block. In this example, block management tables 202a, 202b, and 202c are formed in the block management table area 202. The block management tables 202a, 202b, and 202c accord with the blocks 201a, 201b, and 201c in the user data area 201, respectively.

In such a conventional track set, a user data area and a block management table area are thoroughly separated. In addition, the start position of a block management table is fixed. Each block in the user data area requires a block management table relevant thereto. Thus, if a large block is written in the user data area, the block management table area cannot be maintained. In addition, since the size of the block management table does not depend on the size of a block to be managed, the block management table should have a particular size so that many small blocks can be written in the user data area.

Next, an example for forming a track set will be briefly described. The top position of the user data area 201, in which user data is written, is predetermined. The block 201a is written from the top position of the user data area 201. The relevant block management table 202a is formed from the position denoted by the point A. Thereafter, the block 201a in the user data area 201 is followed by the block 201b. The block management table 202b relevant to the block 201b is preceded by the block management table 202a. The other blocks are written in the user data area 201 until it becomes full. When the user data area 201 is filled with blocks, the headers 200a and 200b are formed. Information with respect to the track set, blocks written in the user data area 201, and so forth are written in the headers 200a and 200b.

At this point, if a large block such as the block 201c is written in the user data area 201, the user data area becomes full with only the block 201c. Thus, a blank area 203 takes place in the block management table area 202 provided for a large number of block management tables. Consequently, the use efficiency of the tape is deteriorated.

OBJECT AND SUMMARY OF THE INVENTION

Therefore, an object of the present invention is to provide a data recording method for use with a data recorder that reduces wasteful areas of track sets and thereby improves the use efficiency of a tape.

According to the present invention, to solve the above-described problem, blocks of user data are written from a first end side of a logical data unit area to a second end side. Block management information is written from the second end side of the logic data unit area to the first end side.

According to the present invention, since user data blocks and management information relevant thereto are written from the different directions of the logic data unit area, data can be filled in the logic data unit area without a loss.

These and other objects, features and advantages of the present invention will become more apparent in light of the following detailed description of best mode embodiments thereof, as illustrated in the accompanying drawings.

BRIEF DESCRIPTION OF THE DRAWINGS

FIG. 18 is a schematic diagram showing an example of the content of a block management table;

FIG. 19 is a schematic diagram showing an example of the content of sub-code data.

DESCRIPTION OF THE PREFERRED EMBODIMENTS

Figure 1:
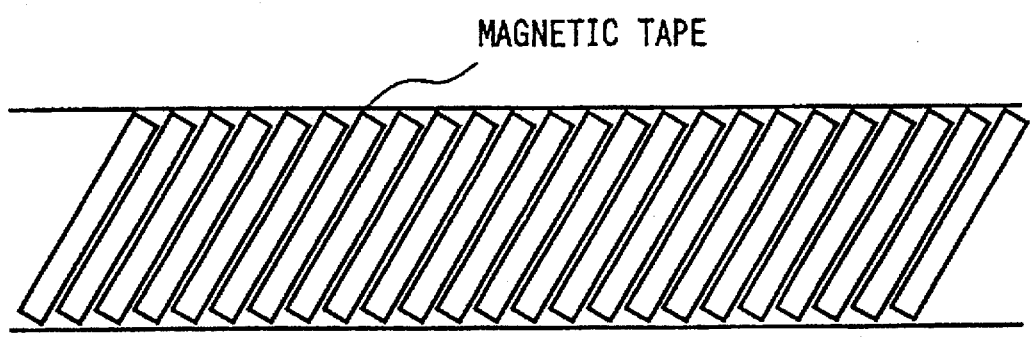
FIG. 1 is a schematic diagram showing a helical track formed by a helical scan type recording method.
Figure 2:
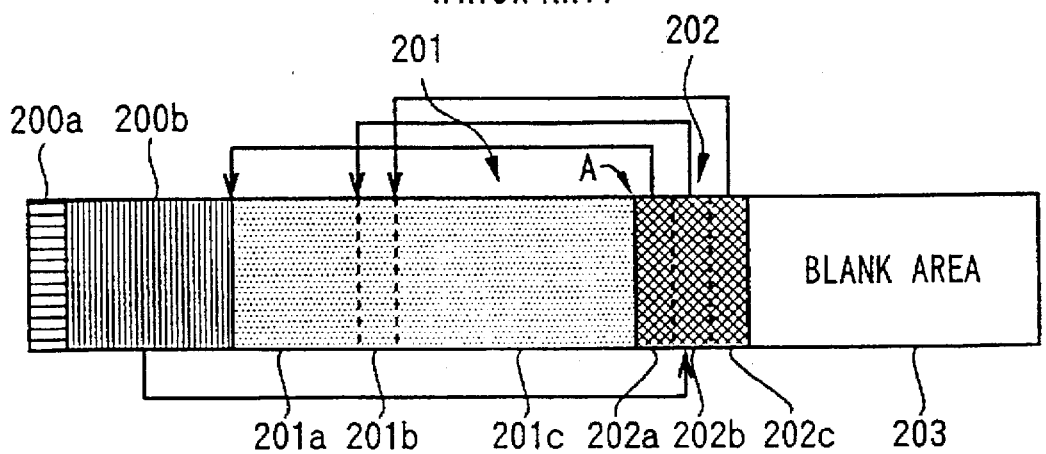
FIG. 2 is a schematic diagram showing a conventional track set.
Figure 3:
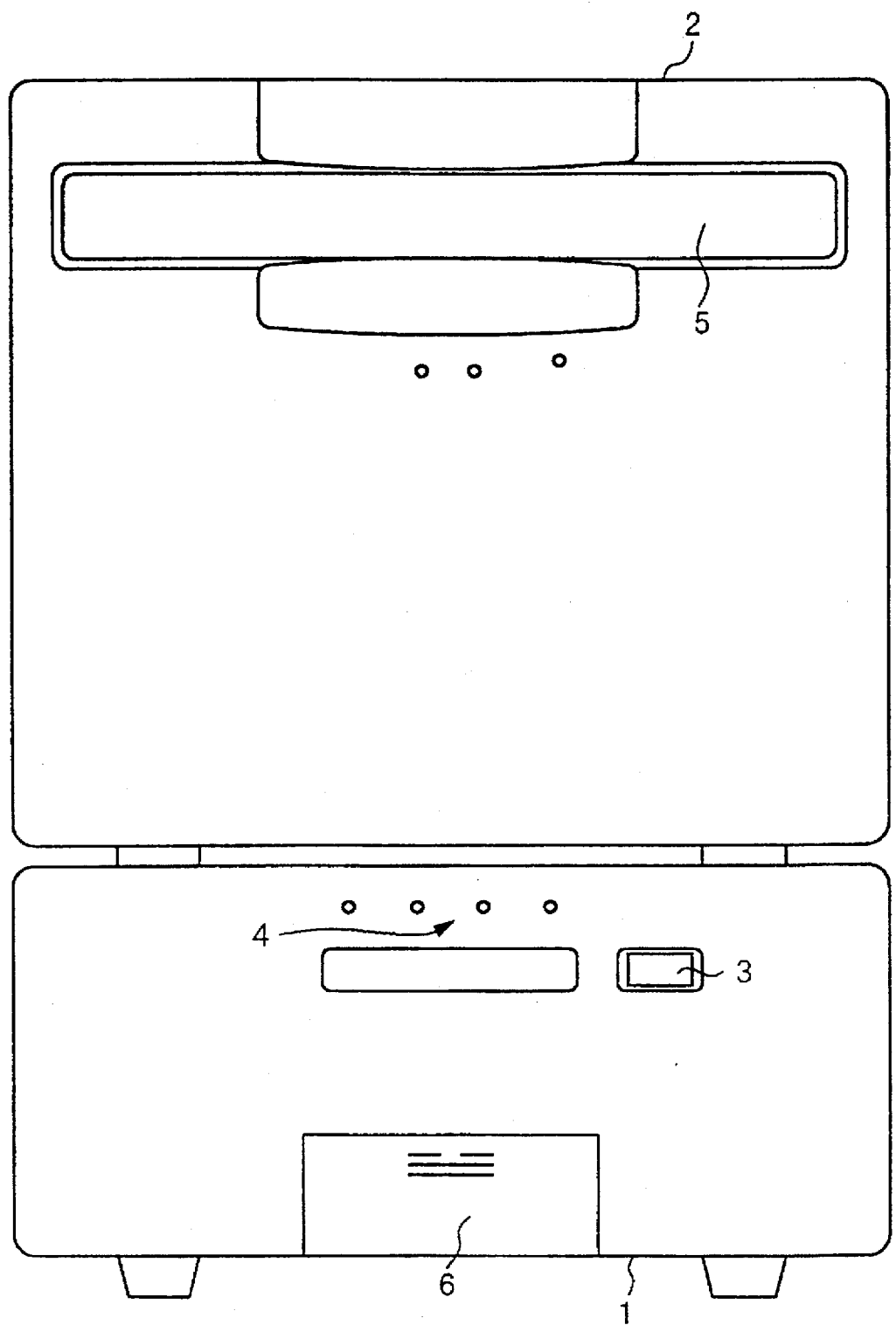
FIG. 3 is an outlined front view showing a data recorder according to the present invention.
Figure 4:
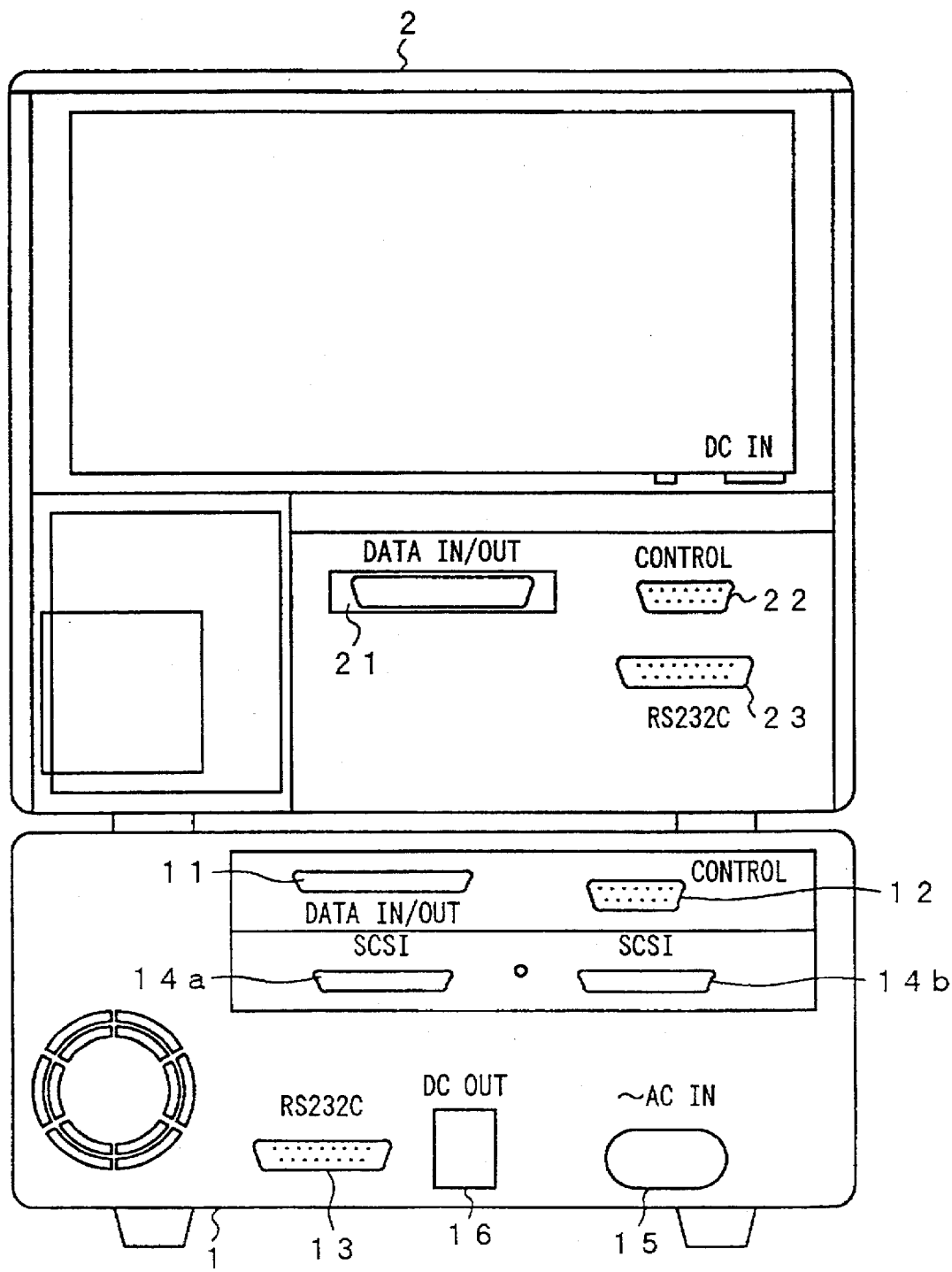
FIG. 4 is an outlined rear view showing the data recorder according to the present invention.

Before explaining embodiments of the present invention, a data recorder according to the present invention will be described. The data recorder records/reproduces digital data to/from a cassette tape with a rotating head. FIG. 3 is a front view showing the data recorder. FIG. 4 is a rear view of the data recorder.

As shown in FIGS. 3 and 4, the data recorder is composed of two units that are an upper unit and a lower unit. The lower unit is literally disposed below the upper unit. The lower unit is a tape drive controller 1. The upper unit is a digital information recorder 2. The tape drive controller 1 has a front panel that includes a button 3 and a plurality of light emitting diodes 4. The button 3 is used to perform the loading/unloading processes for a cassette tape. The light emitting diodes 4 represent whether or not a cassette tape has been loaded, whether or not the power has been turned on, and so forth. The digital information recorder 2 has a front panel with a cassette tape loading/unloading opening 5. In addition, the digital information recorder 2 has a detachable panel 6. Inside the detachable panel 6, other operation buttons are disposed.

As shown in FIG. 4, on the rear panels of the tape drive controller 1 and the digital information recorder 2, a plurality of connectors are disposed. On the rear panel of the lower tape drive controller 1, a data input/output connector 11, a control connector 12, an RS232C connector 13, two SCSI connectors 14 and 14b, an AC power input connector 15, and a DC power output connector 16 are disposed.

On the rear panel of the digital information recorder 2, a data input/output connector 21, a control connector 22, and an RS232C connector 23 are disposed. By connecting a dedicated cable to the DC power output connector 16 of the tape drive controller 1, power is supplied to the digital information recorder 2. The data input/output connectors 11 and 21 are connected with a dedicated cable. Data is sent and received between the controller 1 and the recorder 2. The control connectors 12 and 22 are connected with a dedicated cable. Thus, control signals are exchanged between the controller 1 and the recorder 2. The RS232C connectors 13 and 23 are used for diagnosis purposes.

Figure 5:
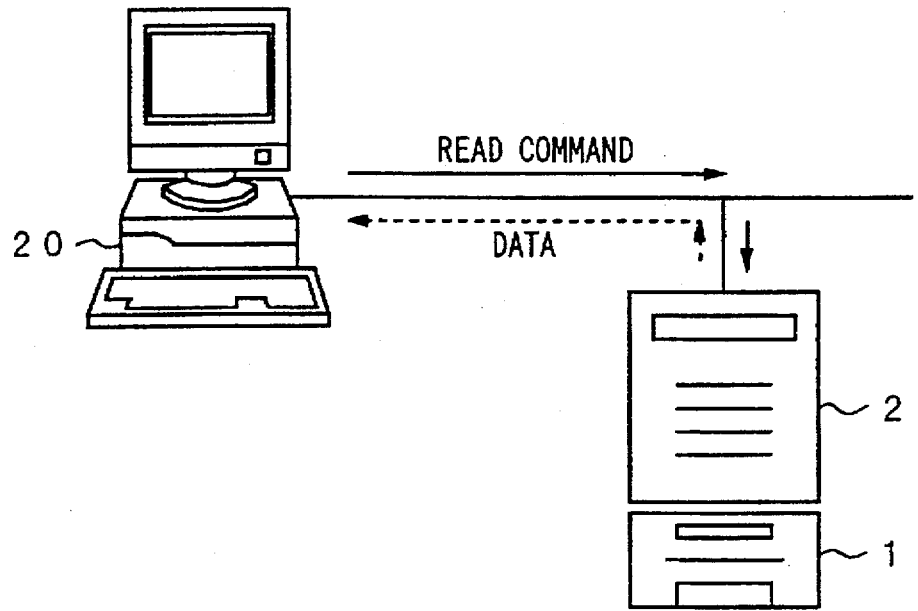
FIG. 5 is a schematic diagram showing an application of the data recorder according to the present invention.

As shown in FIG. 5, when a host computer 20 is connected to the data recorder, the SCSI connectors 14a and 14b are used. When the host computer 20 sends for example a read command to the data recorder, it outputs data to the host computer 20.

Figure 6:
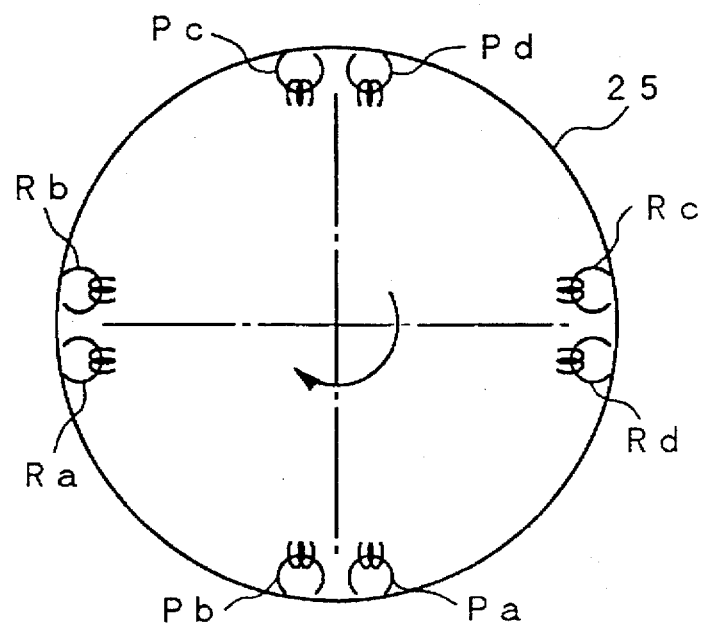
FIG. 6 is a schematic diagram showing the arrangement of heads for use with the data recorder according to the present invention.

The digital information recorder 2 records/reproduces data to/from a cassette tape with rotating heads. (In the following description, the rotating heads may be treated as a single head for convenience.) FIG. 6 shows the arrangement of the heads used in the recorder 2. Four record heads Ra, Rb, Rc, and Rd and four reproduction (playback) heads Pa, Pb, Pc, and Pd are disposed on a drum 25 that rotates at a predetermined speed in the direction shown in FIG. 6.

The heads Ra and Rb are adjacently disposed. This relation applies to pairs of heads Rc and Rd, heads Pa and Pb, and heads Pc and Pd. The extended directions of each pair of heads are different from each other. The extended directions are referred to as azimuths. Referring to FIG. 6, the heads Ra and Rc are disposed at an interval of 180° and have a first azimuth. The heads Rb and Rd are disposed at an interval of 180° and have a second azimuth. The heads Pa and Pc have the first azimuth. The heads Pb and Pd have the second azimuth. With the different azimuths, cross talks can be prevented between adjacent tracks. Each of the adjacent heads is integrally composed as one head. The integrally composed head is referred to as a double-azimuth head.

A tape (for example, ½ inch wide) that is led out of the cassette is helically wound around the periphery of the drum 25 for an angle range of 180° or greater. The tape is supplied at a predetermined speed. Thus, when a signal is recorded to the tape, in the first half period of one rotation of the drum 25, the heads Ra and Rb scan the tape. In the second half period, the heads Rc and Rd scan the tape. When a signal is reproduced from the tape, in the first period, the heads Pa and Pb scan the tape. In the second period, the heads Pc and Pd scan the tape.

Figure 7:
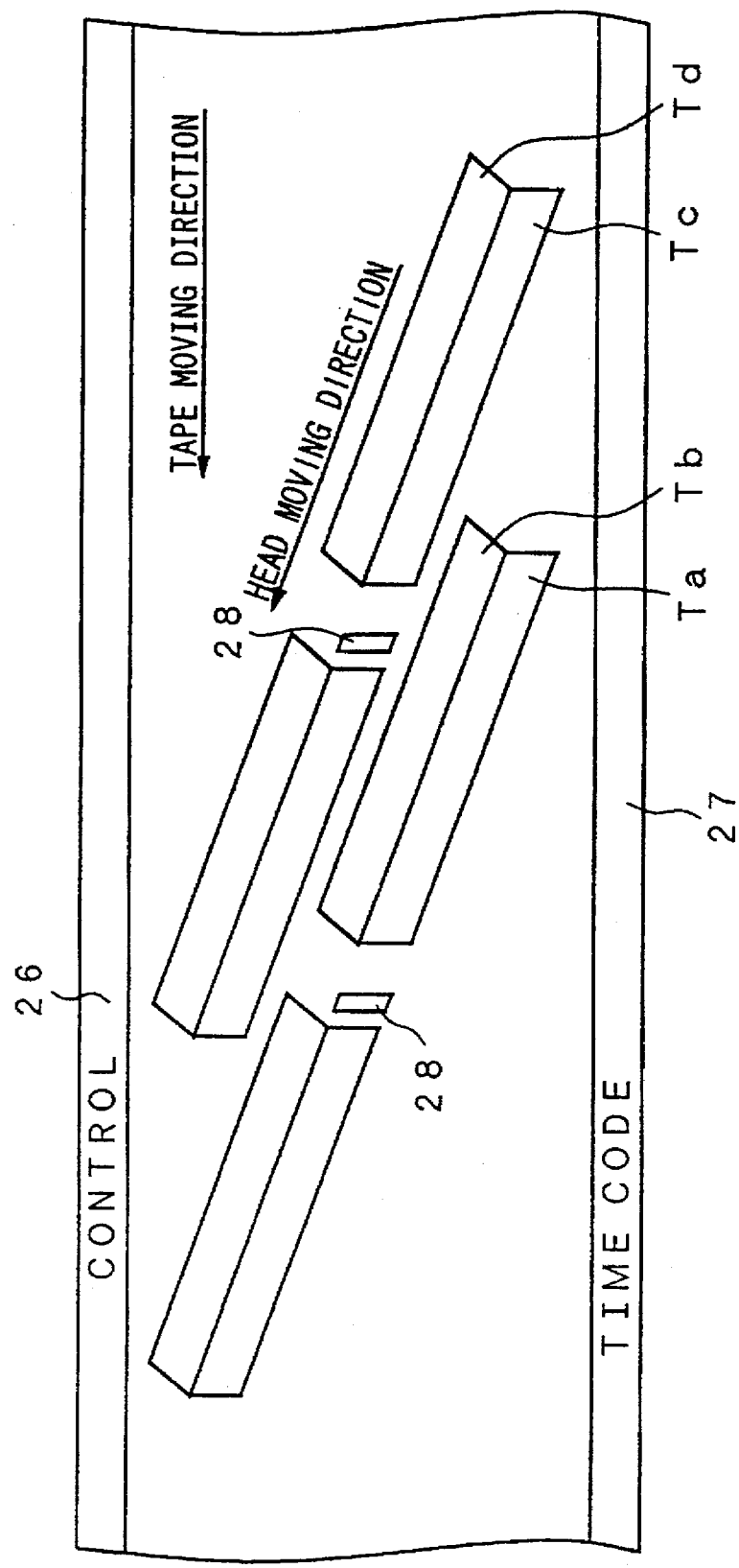
FIG. 7 is a schematic diagram showing a track pattern of the data recorder according to the present invention.

FIG. 7 shows a track pattern on the tape of the digital information recorder 2. Longitudinal tracks are disposed in the width direction of the tape. Helical tracks are disposed between the longitudinal tracks. A control signal is recorded on an upper longitudinal track 26. A time code is recorded on a lower longitudinal track 27. The time code represents the position in the longitudinal direction of the tape. For example, the time code is an SMPTE time code. Whenever the drum 25 is rotated, the head Ra and Rb form two helical tracks Ta and Tb at the same time. Thereafter, the heads Ra and Rb form two helical tracks Tc and Td at the same time. On each helical track, a first half portion and a second half portion are separately formed. Between the first half portion and the second half portion of each helical track, a record area 28 is disposed. The record area 28 is used to record a tracking pilot signal.

The SMPTE time code was developed for a video signal for use with a VCR or the like. The minimum unit of the SMPTE time code is a frame (1/30 second). As will be described later, in the data recorder, data that can be recorded on the four tracks Ta to Td shown in FIG. 5 is defined as a logical data unit (referred to as track set). When 16 tracks accord with one frame of a video signal, a sub-digit (values 0, 1, 2, and 3) lower than the digit of the frame of the time code is defined. This time code is also referred as ID. Since the SMPTE time code has a user data area, such a modification can be performed.

Figure 8:
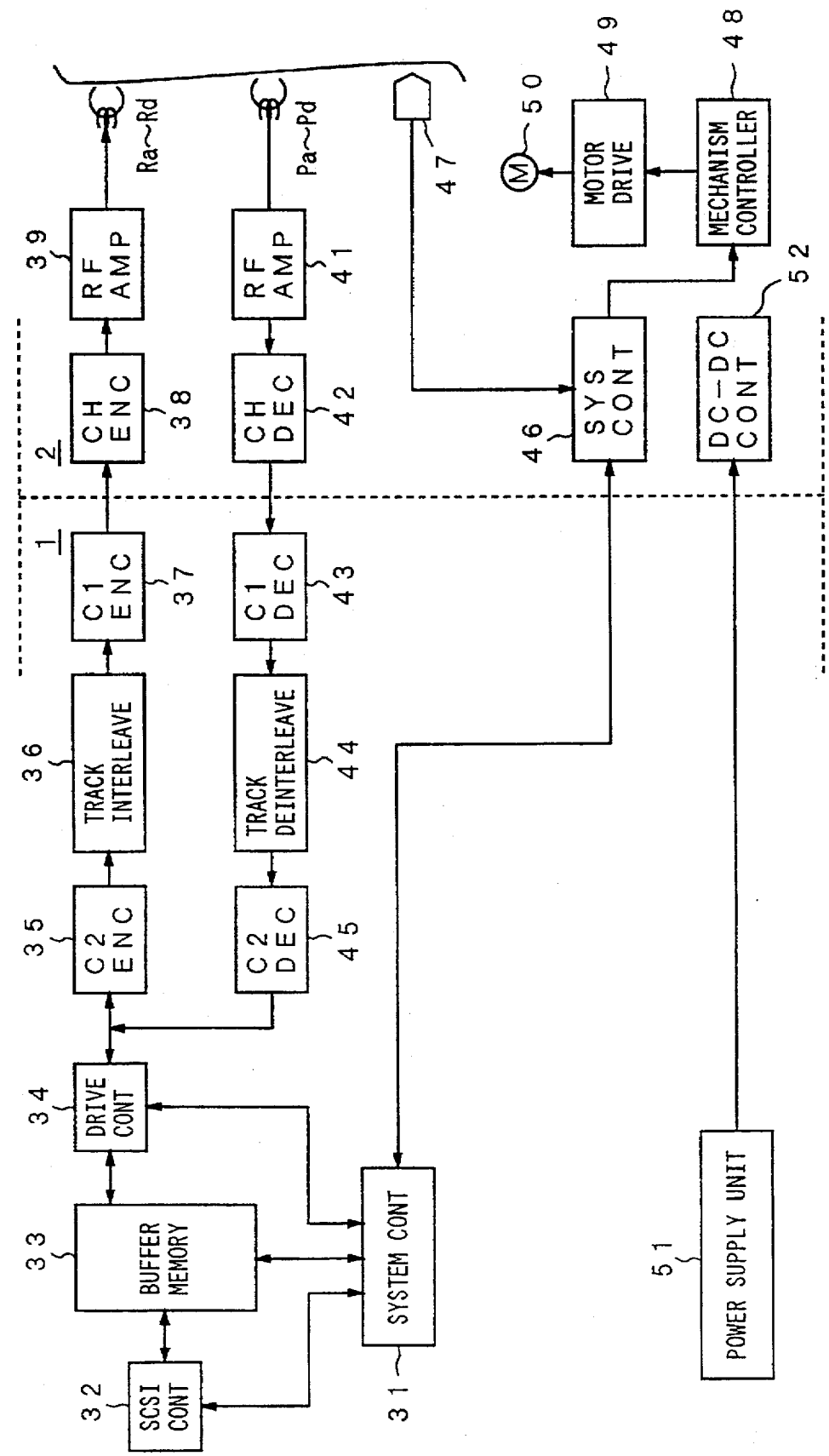
FIG. 8 is a block diagram showing a system structure of the data recorder according to the present invention.

FIG. 8 is an outlined block diagram showing a system structure of the tape drive controller 1 and the digital information recorder 2. The controller 1 has a system controller 31. The system controller 31 in controller 1 has the following functions.

Managing a SCSI controller 32,

Managing a buffer memory 33,

Managing files/tables,

Writing/reading data and managing retries,

Controlling the digital information recorder 2, and performing self diagnosis.

The system controller 31 is connected to the host computer through the SCSI controller 32. A drive controller 34 is disposed between the buffer memory 33 and the tape drive controller 1. Data that is read from the buffer memory 33 is supplied to a C2 encoder 35 through the drive controller 34. The C2 encoder 35 is connected to a track interleave circuit 36 and a C1 encoder 37.

The C2 encoder 35 and the C1 encoder perform an error correction encoding process for record data with a product code. The track interleave circuit 36 controls the distribution of data to tracks so as to improve the error correction performance in the recording/reproducing processes.

When data is recorded on the tape, it is recorded as SYNC blocks separated by a synchronous ssignal. In this case, the track interleave circuit 36 adds a block synchronous signal to the output signal of the C2 encoder 35. The C1 encoder 37 generates a C1 parity. Thereafter, data is randomized and words are interleaved in a plurality of SYNC blocks.

Digital data that is output from the C1 encoder 37 is supplied to the digital information recorder 2. The digital information recorder 2 encodes digital data received from a channel code encoder 38. The resultant record data is output to the record heads Ra to Rd through an RF amplifier 39. The heads Ra to Rd record the record data on the tape. The RF amplifier 39 performs a process corresponding to partial response class 4 (PR (1, 0, −1).

Data reproduced from the tape by the reproduction heads Pa to Pd is supplied to a channel code decoder 42 through an RF amplifier 41. The RF amplifier 41 includes a reproducing amplifier, an equalizer, and a Viterbi decoder. The output data of the channel code decoder 42 is supplied to the tape drive controller 1. The output data of the channel code decoder 42 is supplied to a C1 decoder 43.

The C1 decoder 43 is connected to a track deinterleave circuit 44. The track deinterleave circuit 44 is connected to a C2 decoder 45. The C1 decoder 43, the track deinterleave circuit 44, and the C2 decoder 45 perform the reverse processes of the C1 encoder 37, the track interleave circuit 36, and the C2 encoder 35, respectively. The reproduction (read) data received from the C2 decoder 45 is supplied to the buffer memory 33 through the drive controller 34.

The digital information recorder 2 has a system controller 46. In addition, the digital information recorder 2 has a fixed head 47 for the longitudinal tracks on the tape. The head 47 is connected to the system controller 46. The head 47 records/reproduces a control signal and a time code. The system controller 46 is connected to the system controller 31 of the tape drive controller 1 through a bidirectional bus.

A mechanism controller 48 is connected to the system controller 46. The mechanism controller 48 includes a servo circuit that drives a motor 50 through a motor drive circuit 49. The system controller 46 has for example two CPUs. The system controller 46 communicates with the tape drive controller 1, controls recording/reproducing of a time code, controls recording/reproducing timings, and so forth using the CPUs.

The mechanism controller 48 has for example two CPUs. The mechanism controller 48 controls a mechanical system of the digital information recorder 2 with the CPUs. In particular, the mechanical controller 48 controls the rotation of the head and tape system, the tape speed, the tracking operation, loading/unloading processes of the cassette tape, and the tape tension. The motor 50 includes a drum motor, a capstan motor, a reel motor, a cassette mounting motor, a loading motor, and so forth.

The digital information recorder 2 has a DC-DC converting circuit 52 that receives a DC voltage from a power supply unit 51 of the tape drive controller 1. The digital information recorder 2 also has position sensors (such as a tape end detecting sensor), a time code generating/reading circuit, and so forth (that are not shown).

Next, the record format of digital data will be described.

Figure 9:
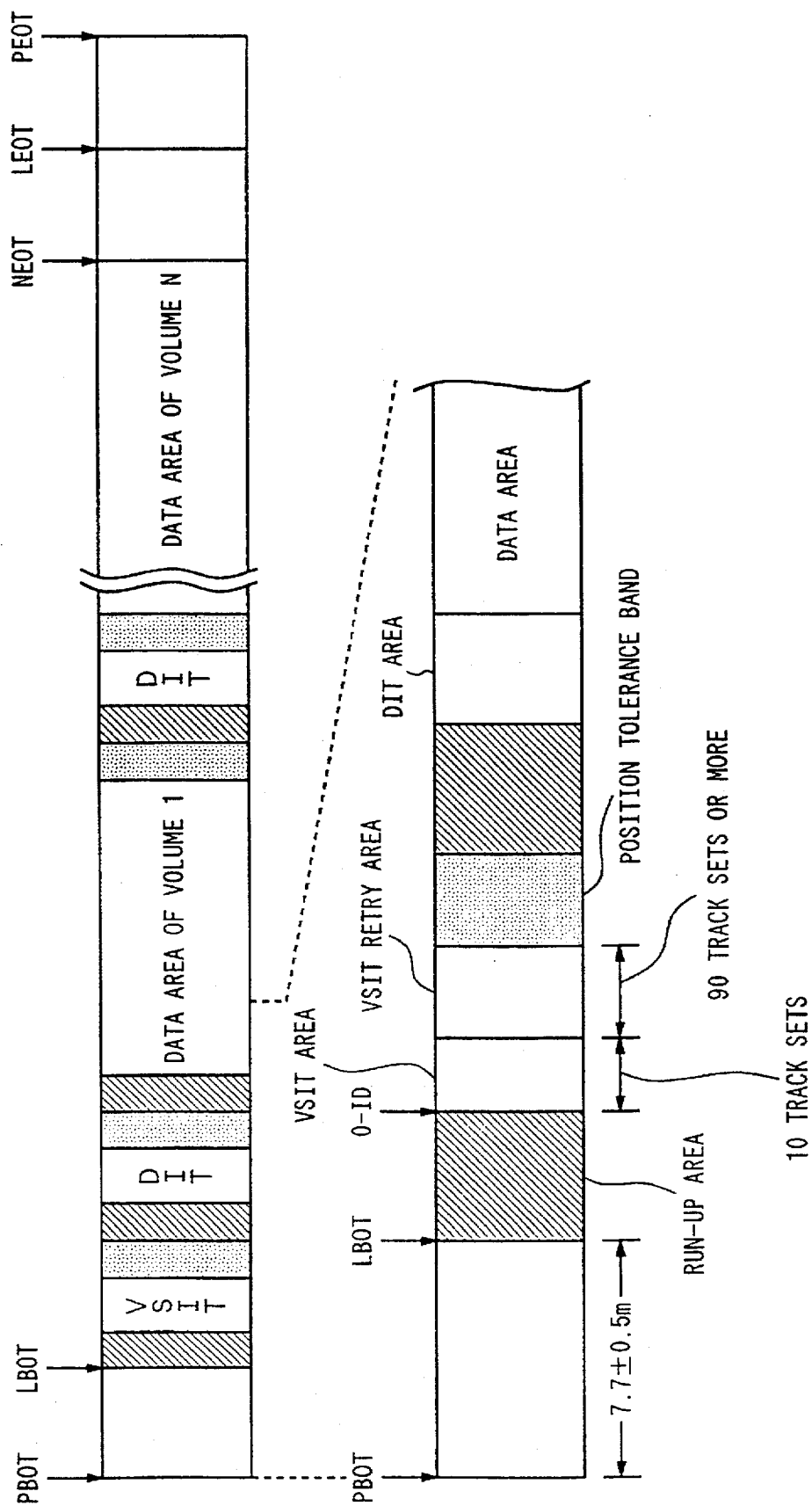
FIG. 9 is a schematic diagram showing a tape format of the data recorder according to the present invention.

FIG. 9 shows the layout of the entire tape (in a cassette, for example). The entire tape is referred to as physical volume. The tape has a leader tape. Between the PBOT (Physical Beginning of Tape) and the PEOT (Physical End of Tape) of a physical tape, a recordable area is between the LBOT (Logical Beginning of Tape) and the LEOT (Logical End of Tape). The recordable area is defined because the tape tends to be damaged at the beginning and end of the tape and thereby the error rates thereof are high. For example, the invalid area between the PBOT and the LBOT is defined 7.7±0.5 m. In addition, the invalid area between the PEOT and LEOT is defined 10 m or greater.

To manage one or more logical volumes (referred to as partitions), a VSIT (Volume Set Information Table) is recorded at the beginning of the record area. The VSIT includes the number of volumes recorded on the tape and position information of the logical volumes on the tape. The position information includes physical IDs of VITs of up to 512 logical volumes, end physical IDs and logical IDs of VITs. The VSIT further includes a flag indicating presence or absence of UIT of each logical volume.

The position at the beginning of the VSIT is defined as the position of 0-ID. An ID is an address corresponding to the position of every set of four tracks on the tape. IDs are simply incrementally assigned from the VSIT area to the DIT area of the last volume. The length of one VSIT is 1-ID.

A logical volume is composed of a DIT (Directory Information Table), an UIT (User Information Table), and a user data area. The DIT has information for managing a file in the logical volume. The length of one DIT is 40-IDs. The UIT is optional. The UIT is user information for managing a file.

In FIG. 9, hatched areas are run-up areas. With run-up areas, data tracks are servo-locked. Dotted areas are position tolerance areas. With the position tolerance areas, when the VSIT and the DIT are updated, valid data can be prevented from being erased.

Figure 10A:
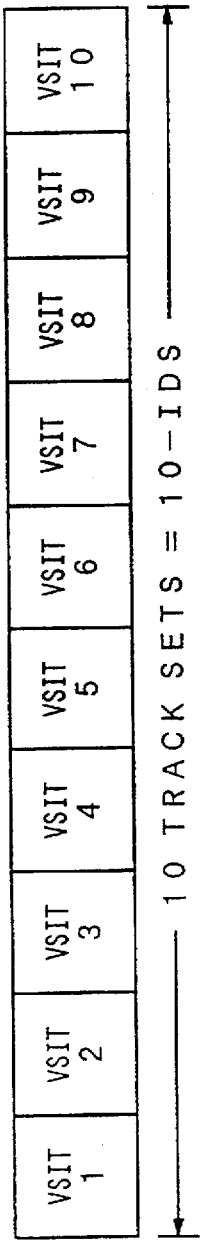
FIGS. 10A, 10B and 10C are schematic diagrams showing formats of a VSIT and a DIT of the data recorder according to the present invention.

As shown in FIG. 10A, the VSIT is repeatedly recorded ten times so as to improve the reliability of data. Thus, the VSIT area is composed of 10 track sets (=10-IDs). The VSIT area is followed by a retry area composed of 90 track sets or more.

Figure 10B:
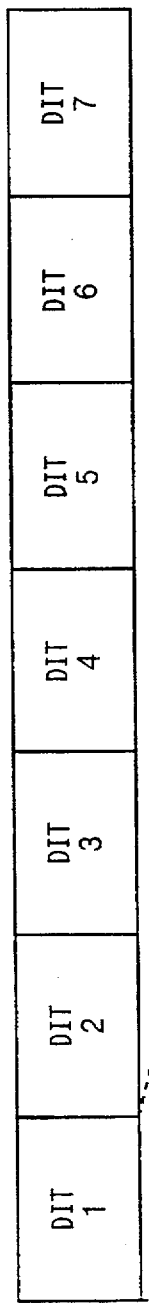
Figure 10C:
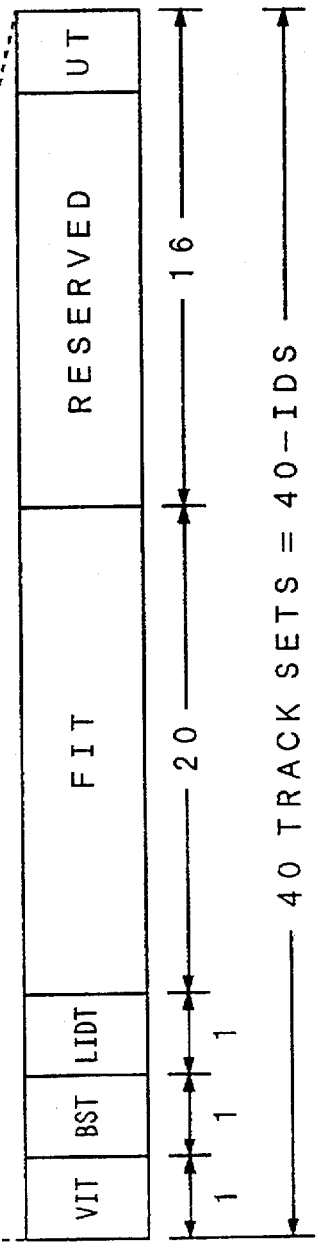

As shown in FIG. 10B, the DIT is repeatedly recorded seven times. As shown in FIG. 10C, the DIT is composed of six tables. The six tables are a VIT (Volume Information Table), a BST (Bad Spot Table), an LIDT (Logical Information Table), an FIT (File Information Table), a UT (Update Table), and a UIT (User Information Table) disposed in the order. Each of the VIT, the BST, the LIDT, and the UT has the length of 1-ID. The FIT has the length of 20-IDs. The remaining area for 16-IDs is reserved.

Next, each table of the DIT will be described. The ID address of the VIT is a physical ID at the beginning of volumes written in the VSIT. The logical ID of the VIT is the logical ID at the beginning of the volumes written in the VSIT. The VIT includes a volume label and volume information such as a start physical ID of the first data block in the physical volume and the last physical ID thereof.

Figure 11:
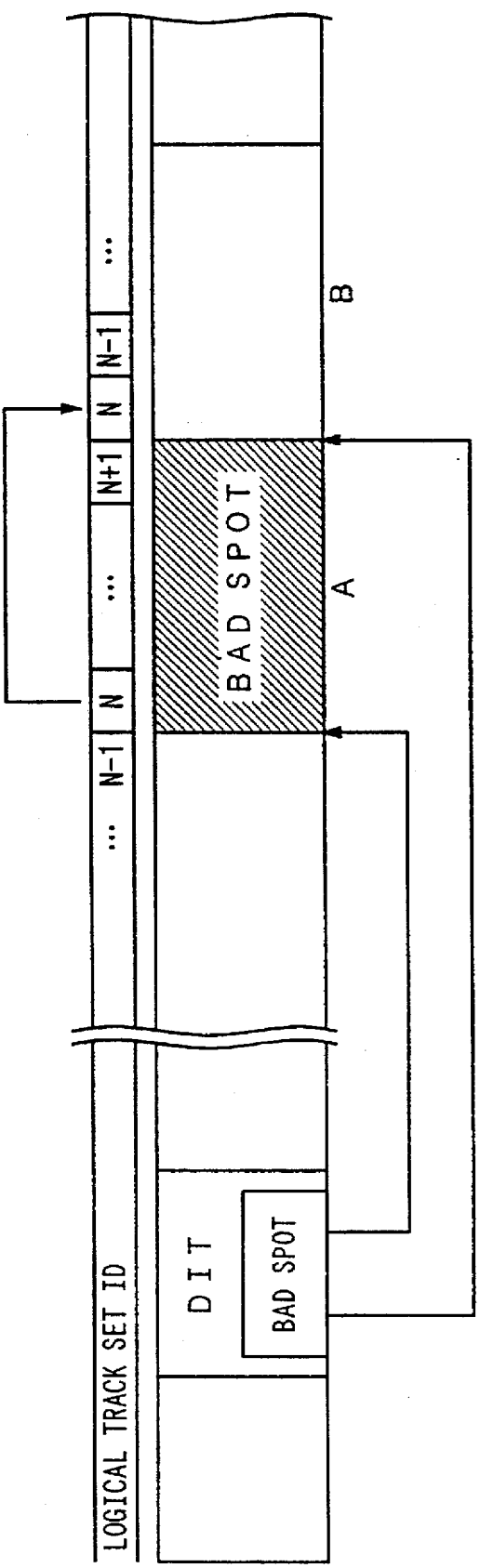
FIG. 11 is a schematic diagram for explaining a BST of the data recorder according to the present invention.

The ID address of the BST is the physical ID of the VIT plus 1, whereas the logical ID thereof is the logical ID of the VIT plus 1. The BST includes information of logically invalid data. The logically invalid data is data that is treated invalid because of presence of the same track set ID. For example, as shown in FIG. 11, a hatched area A is logically invalid data. A write retry operation and a write operation associated therewith cause logically invalid data. When a write operation is performed, if an error takes place, a write retry is automatically performed and an error location thereof is output. The error location is stored in the BST. When a read operation is performed, the BST represents an invalid area. The logically invalid data is also referred to as bad spot. The BST can manage top physical IDs and last physical IDs of up to 14592 bad spots.

The ID address of the LIDT is the physical ID of the VIT plus 2, whereas the logical ID thereof is the logical ID of the VIT plus 2. The LIDT is a data table for a high speed block space and a locating operation. In other words, the LIDT includes logical IDs and physical IDs of pointers 1 to 29, file numbers, and the first block number of the ID data in the block management table.

The ID address of the FIT is the physical ID of the VIT plus 3, whereas the logical ID thereof is the logical ID of the VIT plus 3. The FIT is composed of two types of data corresponding to tape marks. The tape marks are file delimiter codes. The N-th data pair accords with an N-th tape mark counted from the beginning of the volume. One data of each pair is the physical ID of the N-th tape mark. This value is the physical track set of the tape mark. The other data of the pair is the absolute block number of the tape mark N. This value is the absolute block number of the last block with the same file number as the tape mark. The position of the tape mark can be detected. Thus, a desired physical position on the tape can be accessed at a high speed.

The ID address of the UT is the physical ID of the VIT plus 39. The UT is information that represents whether or not a volume has been updated. Before a volume has not been updated, a word (four bytes) that represents the update status of the UT is FFFFFFFFh (h represents hexadecimal notation). After a volume has been updated, the word is 00000000h.

The UIT is optional. The UIT is an area of for example 100-IDs. The UIT is a user accessible data table for storing a user header.

Figure 12:
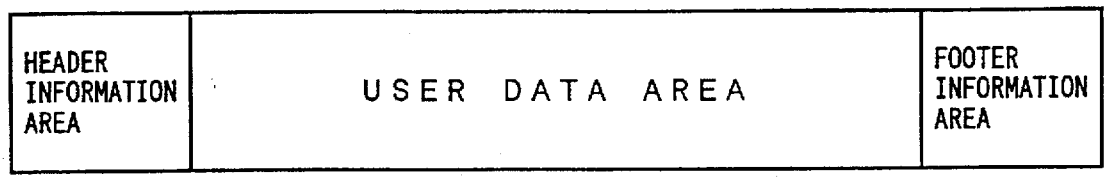
FIG. 12 is a schematic diagram for explaining a logical format of the data recorder according to the present invention.

In this example, 1-ID is assigned to each track set composed of four helical tracks. The logical structure of a data block is defined for each track set. FIG. 12 shows the structure of a logical track set. As shown in FIG. 12, a header information area, a user data area and a footer information area are included in one track set. The header information area consists of management information of related track set. The ID and another information of above mentioned table (VSIT, VIT, and BST, etc . . . ) are included the header information area, for example. The user data area includes the data is sent block by block in a burst manner from host computer, and block management table which manages the data blocks. A code indicated end of this track set is written into the footer information area.

Figure 13:
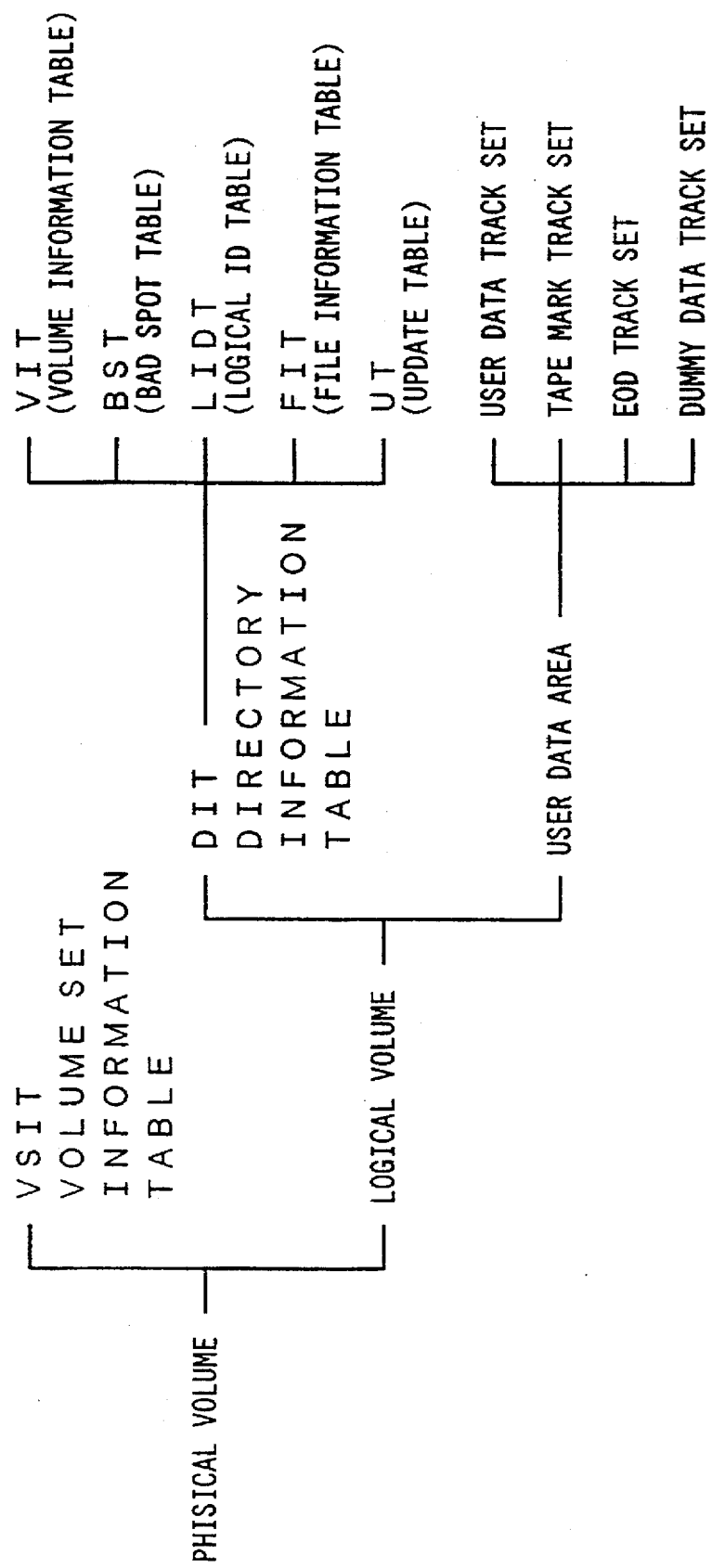
FIG. 13 is a list for explaining a format structure of the data recorder according to the present invention.

FIG. 13 shows the logical formats of the data recorder. The VSIT is recorded for each physical volume such as one volume of tape. A DIT is recorded for each logical volume (partition). The DIT includes five tables that are a VIT, a BST, an LIDT, an FIT, and a UT. In addition, the DIT includes a UIT as optional. In addition, the track set is defined every four helical tracks, the user data area in the track set includes four types of track sets that are a user data track set, a tape mark track set, an EOD (End Of Data) track set, and a dummy track set.

Figure 14:
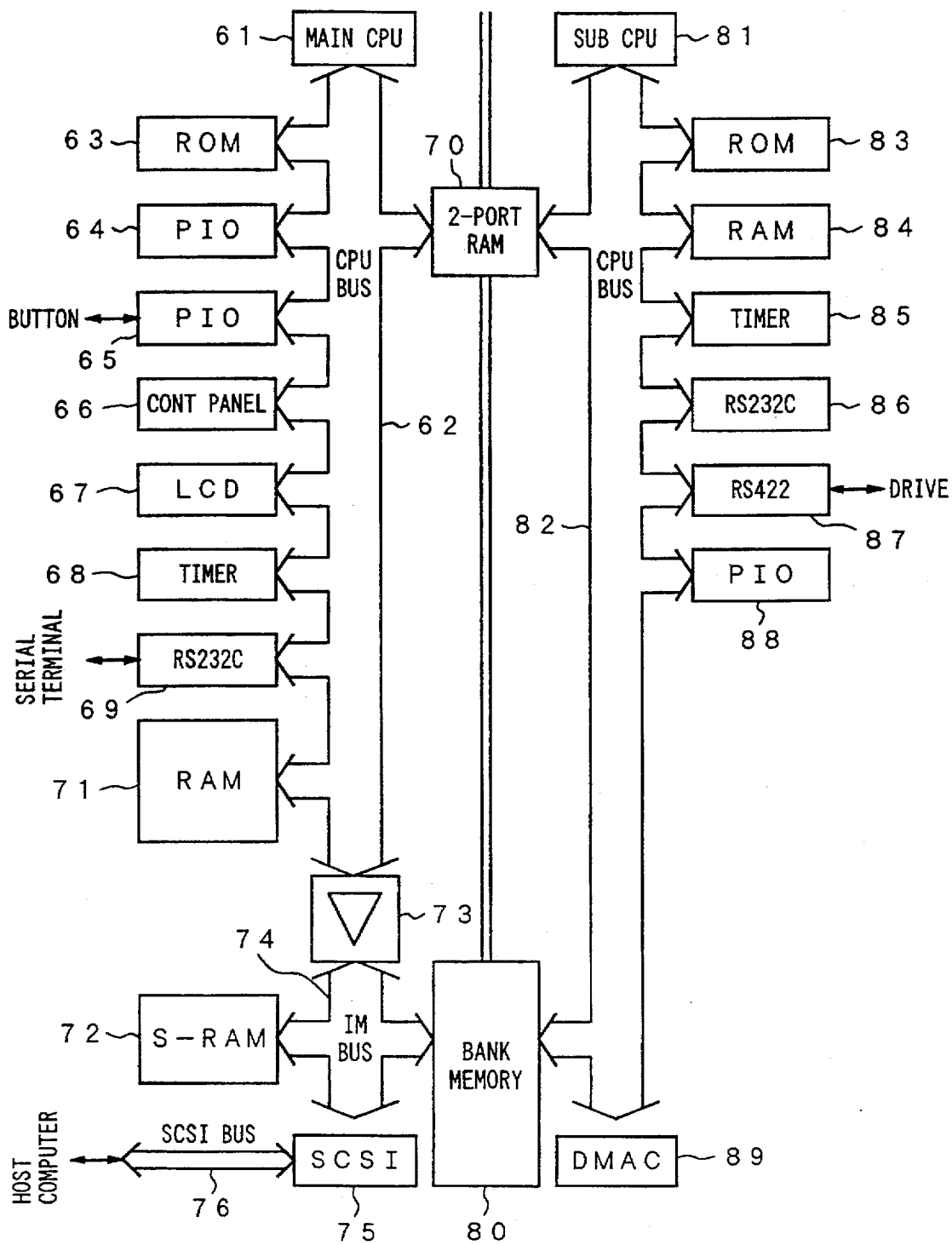
FIG. 14 is a detailed block diagram showing a system structure of the data recorder according to the present invention.

FIG. 14 is a block diagram showing a system structure of the tape drive controller 1. Reference numeral 61 is a main CPU. Reference numeral 70 is a two-port RAM. Reference numeral 80 is a bank memory. Reference numeral 81 is a sub CPU. The main CPU 61 is a CPU that manages the entire system. In association with the main CPU 61, a CPU bus 62 is disposed. Each structural portion of the tape drive controller 1 is connected to the CPU bus 62. In other words, a ROM (flash ROM) 63, PIOs (parallel I/Os) 64 and 65, a control panel 66, an LCD 67, a timer 68, an RS232C interface 69, a two-port RAM 70, and a RAM 71 are connected to the CPU bus 62.

The PIO 65 is connected to a button on the front panel. The LCD 67 is a display unit that displays the operation state of the drive so that the user can know it. The RS232C interface 69 is connected to a serial terminal. The RAM 71 is a work RAM for use with firmware. The RAM 71 has a down-load area of programs and temporarily stores header information (VSIT/DIT).

An IM bus 74 is connected to the CPU bus 62 through a unidirectional controlling device 73. An S-RAM 72, a bank memory 80, and an SCSI controller 75 are connected to the IM bus 74. The host computer is connected to the SCSI controller 75 through a bus 76. The S-RAM 72 is a back-up RAM with a condenser. The S-RAM 72 is used for a script memory. In addition, the S-RAM 72 is a memory which holds data of the logger. After the power of the system is turned off, this memory can hold data for around two days.

The two-port RAM 70 stores five types of packets for communicating information between the two CPUs 61 and 81. The five types of packets are (1) a command transmission packet that is used when the main CPU 61 requests the sub CPU 81 to perform an operation, (2) an end status reception packet that is used when the end status of the operation of the sub CPU 81 is sent corresponding to a command requested by the main CPU 61, (3) a command status that is a flag representing the progress status of a command, (4) a drive management status table used to inform the main CPU 61 of the status of the drive (this table is rewritten by the sub CPU 81 at predetermined periods), and (5) a data send/receive packet that is a buffer used when the firmware on the drive (recorder) side is down-loaded through the SCSI bus or when a diagnosis on the drive side is activated with the serial port of the main CPU 61. The bank memory 80 is a buffer memory for data.

The sub CPU 81 is a CPU that controls the drive. In association with the sub CPU 81, a CPU bus 82 is disposed. The CPU bus 82 is connected to a ROM (flash ROM) 83, a RAM (work RAM) 84, a timer 85, an RS232C interface 86, an RS422 interface 87, a PIO (Parallel I/O) 88, and a DMA controller 89. In addition, the CPU bus 82 is connected to the two-port RAM 70 and the bank memory 80.

The bank memory 80 stores data that is written to the tape or data that is read from the tape. The bank memory 80 has for example eight memory banks in which write data or read data is stored. The DMA (Direct Memory Access) controller 89 stores data written to the drive to the bank memory 80. The RS232C interface 86 is used for a self diagnosis. The RS422 interface 87 is a communication means with the drive.

Figure 15:
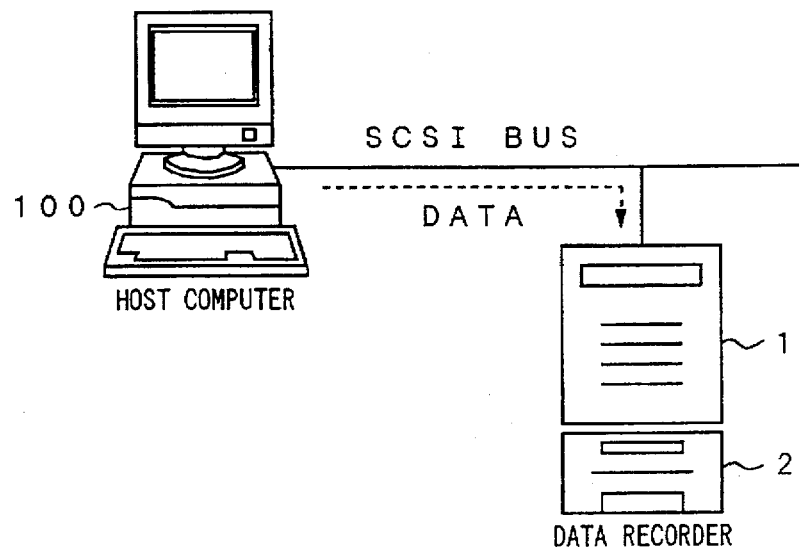
FIG. 15 is a schematic diagram showing an example of the use of a data recorder according to the present invention.

FIG. 15 shows an example of the use of a data recorder according to the present invention. In this case, as an example of the above-described four types of track sets, a user data track, on which user data is written, will be described.

A data recorder 101 composed of a tape drive controller 1 and a digital information recorder 2 is connected to a host computer 100 through a SCSI bus 76. When data is written on a magnetic tape loaded in the data recorder 101, data is sent block by block in a burst manner from the host computer 100 to the data recorder 101 through the SCSI bus 76.

When the data recorder 101 receives the data, a main CPU 61 of the tape drive controller 1 adds management information such as header information and footer information to the data. The resultant data is written as a track set to a bank memory 80. The data is sent from the bank memory 80 to the digital information recorder 2 through an RS422 interface 87 and a PIO 88. The resultant data is written on a magnetic tape.

FIGS. 16A to 16D show steps for forming a track set. In FIGS. 16A to 16D, the top position of the track set is disposed on the left side. First, the host computer 100 sends a write command to the data recorder 101 through the SCSI bus 76 so as to cause the data recorder 101 to write data on the magnetic tape. The write command is sent to a SCSI controller 75 of the data recorder 101 and then stored in an S-RAM 72. The CPU 61 reads the write command from the S-RAM 72. The CPU 61 sends a data read command to the SCSI controller 75.

Figure 17:
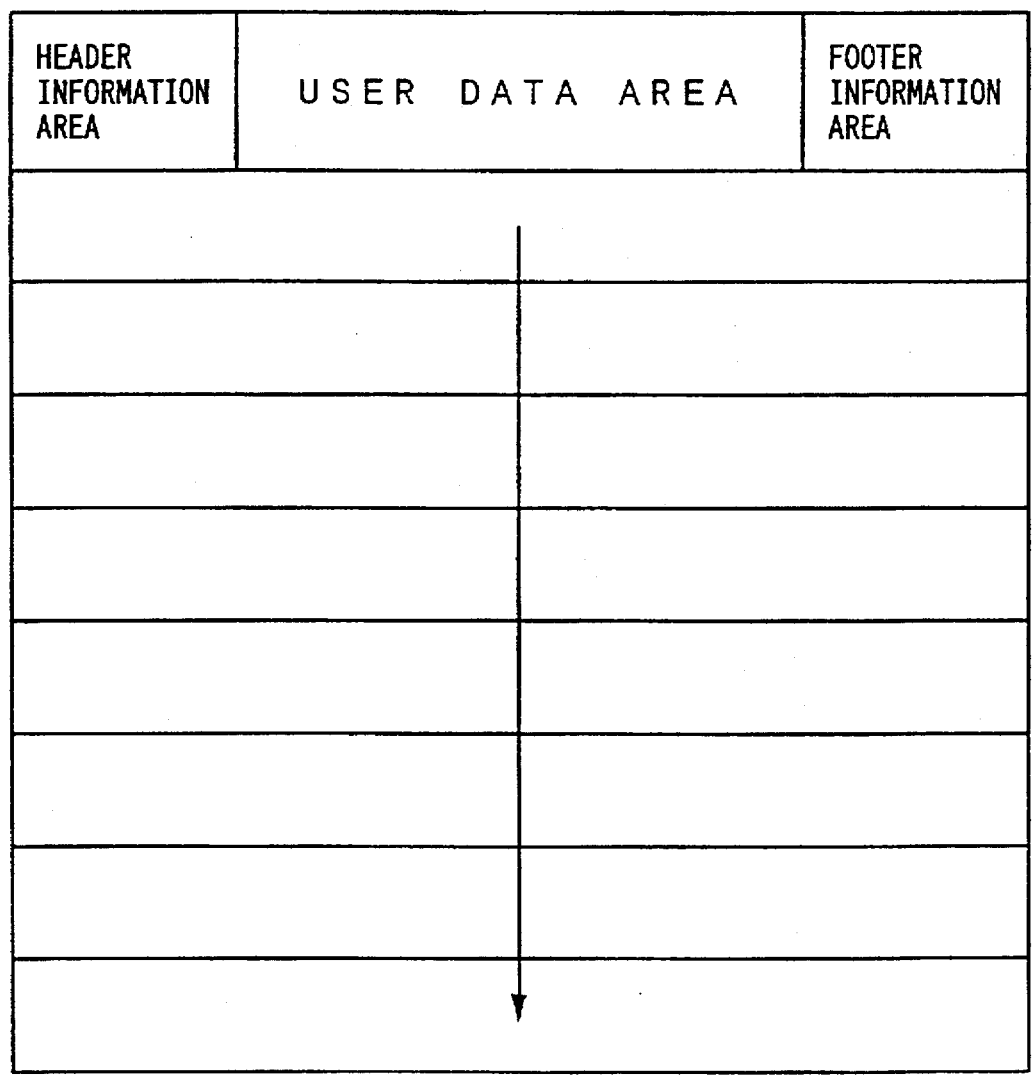
FIG. 17 is a schematic diagram for explaining the relation between a bank memory and a track set.

After the host computer 100 issues the write command, it sends data to be written on the magnetic tape to the data recorder 100. The data is sent block by block in a burst manner. The data is sent to the SCSI controller 75 and then written to a predetermined data area of the bank memory 80. As shown in FIG. 17, the bank memory 80 stores the data as track sets written on the tape. Thus, the data is written at a position relevant to a track set in the bank memory 80. In other words, first data is written from the top position of the user data area shown in FIG. 13 in the direction of the last position thereof.

When data is written to the bank memory 80, the main CPU 61 forms a block management table relevant to the data. FIG. 18 shows an example of the content of the block management table. In the block management table area, block management tables that are eight word long are formed.

Word 0 represents an ID of a data block (for example, the first data block) managed by the block management table. Word 1 represents a file number relevant to the data block managed by the block management table. Word 2 represents a block number of the data block managed by the block management table. Word 3 represents an absolute block number used to manage the logical block number of the data block in the volume. Word 4 represents the top position of the data area used to manage the start address of 1-ID to be referenced. Word 5 represents the data size of the block managed by the table (in bytes). In addition, word 5 represents information of whether or not the block is a part of a large block and information of whether or not the block is followed by another block. Word 6 represents the total number of bytes of the block managed by the table. Word 7 is reserved.

"Offset in ID" represents the position of each of the above-described words in the track set (in bytes).

Figure 16A:
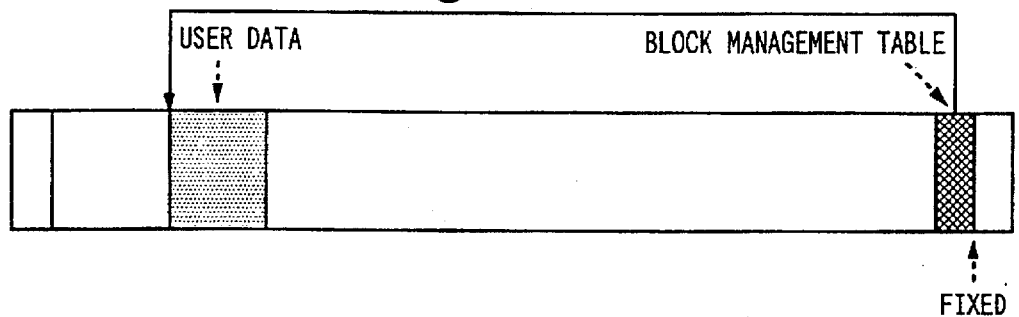
FIGS. 16A to 16D are schematic diagrams showing forming steps of a track set according to the present invention.

As represented with "offset in ID" shown in FIG. 18, block management tables are successively written from the last position of the track set. FIG. 16A shows the state that first user data and a block management table relevant thereto are written in a track set. As shown in FIG. 18, the size of one block management table is fixed at eight words. In addition, the last position of the block management table area in which the block management table is formed is also fixed. The first block management table is written from the position that is earlier than the last position of the block management table area for the size of the block management table.

In the example shown in FIG. 18, since the reserved area preceded by the block management table area starts at the position of byte 117024, the block management table is written from the position of byte 116992 that is earlier than the position of byte 117024 for 32 bytes. In such a manner, a block management table relevant to the first block is formed.

Figure 16B:
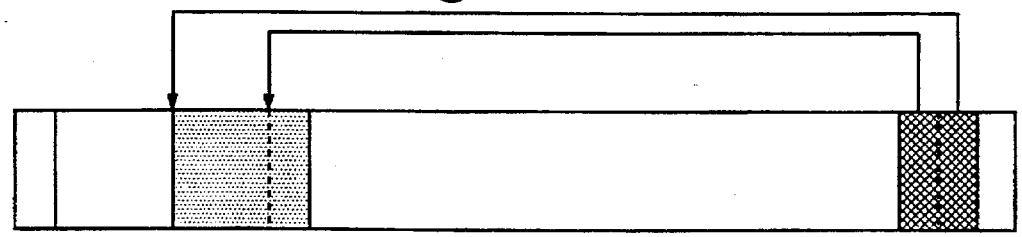

Next, a second block is written. The second block is just preceded by the first block. After the second block is written, a block management table relevant thereto is formed. The second block management table is formed from the position that is earlier than the top position of the first block management table for 32 bytes (namely, from the position that is earlier than the position of the second block management table for the size thereof in the direction of the last position of the track set). FIG. 16B shows the state that a second block and a block management table relevant thereto are written. In such a manner, user data is written from the top position of the track set. In contrast, block management tables are formed from the last position of the track set.

Figure 16C:
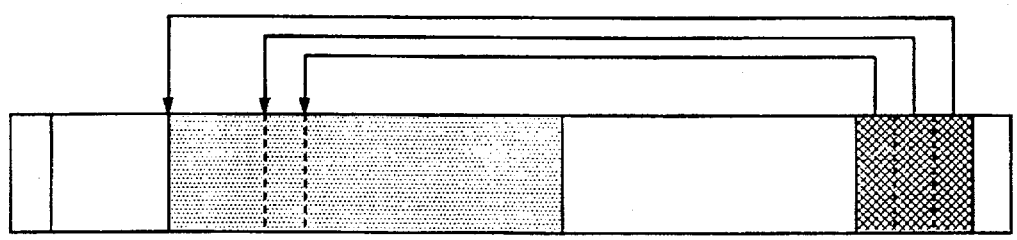

When the data area has a blank space, a third block, a fourth block, and so forth are written in the same manner as the second block. Thus, blocks and block management tables relevant thereto are written. FIG. 16C shows the state that a third block and a block management table relevant thereto are written in the track set.

When the size of a blank area between the position of the last user data in the user data area and the top position of the last block management data in the block management data area becomes a predetermined value (for example 48 bytes or less) or when the number of block management tables exceeds a predetermined value (for example, 512), blocks and block management tables relevant thereto are written no more. When the last block cannot be fully written in the track set, the block is divided and the portion that is not written in the track set is written in the next track set. The information of which the block is divided is written in a relevant block management table.

After the last block is written, a block terminate code is written to the last position of the last block. In addition, as header information, a format ID and sub-code data are added at the top position of the track set. The format ID is for example (FFFF0000h). FIG. 19 shows an example of the content of the sub-code data. Referring to FIG. 19, the effective number of block management tables relevant to blocks written in the track set is written to the sub-code data as effective block table count.

Figure 16D:
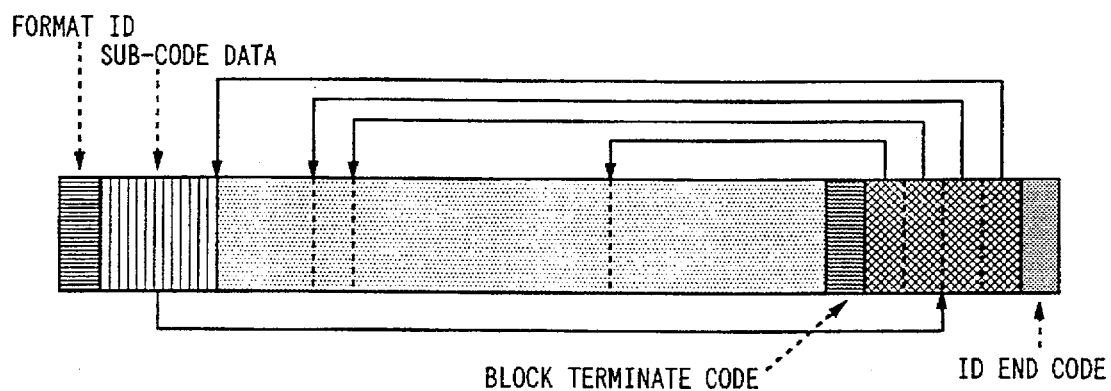

After the header information of the track set is written, an ID end code (0F0F0F0Fh) that represents the last position of the track set is written after the block management table area. Thus, as shown in FIG. 16D, one track set is formed.

When the track set is stored in the bank memory 80 in such a manner, the main CPU 61 causes a two-port RAM 70 to store a command so as to write the track set on the tape. The command stored in the two-port RAM 70 is read by a sub-CPU 81. The sub CPU 81 sends the write command to a system controller 46 of the digital information recorder 2. In addition, the sub CPU 81 sends a command to a DMAC 89 so that it sends particular data stored in the bank memory 80 to the drive controller 34 of the tape drive controller 1. Thus, the DMAC 89 sends the data to the drive controller 34 through the PIO 88.

When the system controller 46 receives the write command, a motor is controlled so as to write the data on the tape. In addition, after the data is sent to the drive controller 34, the output data thereof is sent to a signal processing portion that is composed of a C2 encoder 35, a track interleave circuit 36, a C1 encoder 37, a channel encoder 38, and an RF amplifier 39. Data that has been signal-processed in the signal processing portion is sent to a head. Thus, the data is recorded on the tape.

Figure 20:
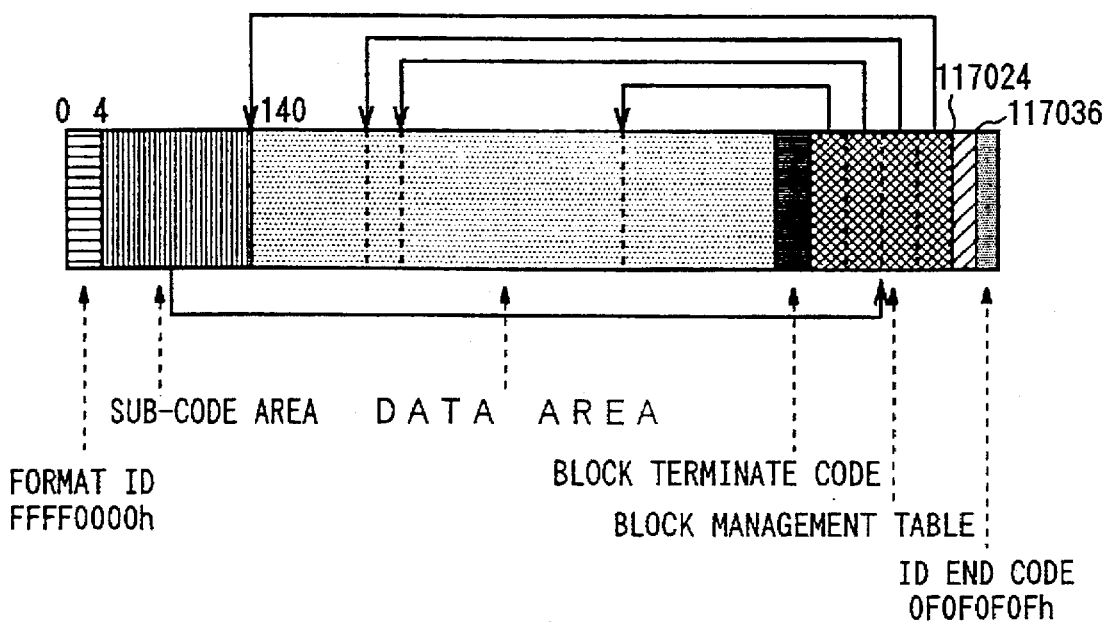
FIG. 20 shows two representations of a track set as written on a tape in accordance with the present invention.

FIG. 20 is a schematic diagram showing an example of a track set written on the tape in the above-described manner. Each track set is composed of four helical tracks of the tape. A format ID (FFFF0000h) is written in the first four bytes. The format ID is followed by a sub code area of 136 bytes. Sub code data is written in the sub code area. The sub code data includes management information of block management tables.

The sub code area is followed by a data area that ends at the position of byte 117023. The data area is used for user data and block management tables. Blocks of the user data are managed by relevant block management tables. As described above, the user data is written from the top position of the data area (namely, the position of byte 140). Block management tables are written from the last position of the data area (namely, the position of byte 117023). At this point, the first block is managed corresponding to the last block management table. The second block is managed corresponding to a block management table followed by the last block management table. In such a manner, blocks are managed corresponding to block management tables relevant thereto.

A reserved area is formed from the position of byte 117024 for 12 bytes. The value of the reserved area is always "0". The reserved area is followed by an ID end code (0F0F0F0Fh) that represents the last position of the track set.

Next, a data reading process for reading data written on the magnetic tape will be described. Data on the magnetic tape is read by a head. The resultant data is signal-process by a signal processing portion composed of an RF amplifier 41, a channel decoder 42, a C1 decoder 43, a track deinterleave circuit 44, and a C2 decoder 45. The resultant data is written track set by track set to a bank memory 80.

The data written to the bank memory 80 is read by the main CPU 61. The main CPU 61 determines whether or not the sub code in a track set represents user data. When the track set represents user data, a relevant block management table is read corresponding to an address represented by the sub code. Block data is read corresponding to the content of the block management table for the length of the block data. In addition, the main CPU 61 sends a data transfer command to the SCSI controller 75. When the SCSI controller 75 receives the data transfer command, it sends block data read from the bank memory 80 to the host computer through the SCSI bus 76.

When a plurality of data blocks have been written in the data area, block management tables relevant to the data blocks are read in the direction of the top position of the track set. At this point, whenever a block management table is read, a data block relevant thereto is sent to the host computer in the above-described manner.

As described above, an ID end code is written at the last position of the track set. When data is written on the magnetic tape, the above-described signal processing portion detects the ID end code and sends it to an RF portion such as the RF amplifier 39. Thus, a data error such as a data deviation that takes place between the SCSI controller 75 that is an interface with the host computer and the signal processing portion can be detected.

In addition, when data is read from the magnetic tape, since the host computer detects the data on the tape, the host computer can detect a data error such as a data deviation that takes place between the RF portion and the SCSI controller 75. Since the ID end code is written in such a manner, erroneous data can be prevented from being sent to the host computer.

When a detected ID end code is different from a predetermined value, it can be determined that a data error takes place.

As described above, according to the present invention, user data is successively written from the top position of the data area. In contrast, block management tables are successively written from the last position of the data area. Thus, a blank area can be effectively prevented in the data area. Consequently, the record area can be effectively used.

In addition, according to the present invention, since the ID end code is written at the last position of a track set, even if an ID error or the like takes place between the SCSI controller and the signal processing portion, since it can be detected when data is written to the tape, the host computer can be informed of the error.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A method for recording user data and management data relevant to each block of the user data on a recording medium for use with a data recorder, said method comprising the steps of:

(a) storing a block of the user data in a user data storage area of a memory, said memory being made up of a plurality of memory units arranged in a memory sequence, and said user area including a portion of said memory units that starts at the beginning of said memory sequence and ends at a user area endpoint;

(b) storing a block of the management data corresponding to said block of user data in a management data storage area of said memory, said management data storage area including a portion of said memory units that starts at a management area begin point and ends at the end of said memory sequence, said user area endpoint occurring earlier in said memory sequence than said management area begin point;

(c) repeating said step (a) and said step (b) for each block of the user data; and (d) recording the user data and the management data stored in said memory on the medium, wherein as said step (a) is repeated for each block of the user data, said user blocks are stored in a forward sequence within said user data storage area, said forward sequence starting at the beginning of said memory sequence and ending at a user data storage markpoint, said user data storage markpoint occurring earlier in said memory sequence than said user area endpoint, and wherein as said step (b) is repeated for each block of the management data, said management blocks are stored in a reverse sequence within said management data storage area, said reverse sequence starting at the end of said memory sequence and ending at a management data storage markpoint, said management data storage markpoint occurring later in said memory sequence than said management area begin point.

2. The method as set forth in claim 1, wherein said blocks of management data have a predetermined size.

3. The method as set forth in claim 1, further comprising the step of:

detecting whether or not an area of blank medium between the medium position corresponding to said user data storage markpoint and the medium position corresponding to said management data storage markpoint has a predetermined size or larger, and wherein when said blank area has the predetermined size or larger, said step (a) and said step (b) are repeated, and wherein when said blank area has a size that is less than the predetermined size, a block terminate code is included within said management data storage area.

4. The method as set forth in claim 1, further comprising the step of:

detecting whether or not the number of blocks of the management data stored in said memory is a predetermined value or less, wherein when said number of blocks of the management data is the predetermined value or less, said step (a) and said step (b) are repeated, and wherein when said number of blocks of the management data is more than the predetermined value, a block terminate code is included within said management data storage area.

5. The method as set forth in claim 1, wherein said memory is adapted for storing a plurality of track sets, each said track set including at least one user data storage area and at least one management data storage area.

* * * * *